ELECTRONIC SORTING OF DOCUMENTS

Filed Oct. 3, 1963 2 Sheets-Sheet 1

INVENTOR.
Pierre Charles Jorgensen
BY
Bauer and Seymour
ATTORNEYS

Sept. 16, 1969 P. C. JORGENSEN 3,467,819

ELECTRONIC SORTING OF DOCUMENTS

Filed Oct. 3, 1963 2 Sheets-Sheet 2

INVENTOR.

Pierre Charles Jorgensen

BY

Cushman, Darby & Cushman (signature)

ATTORNEYS

United States Patent Office 3,467,819
Patented Sept. 16, 1969

3,467,819
ELECTRONIC SORTING OF DOCUMENTS
Pierre Charles Jorgensen, L'Hay-les-Roses, France, assignor to Compagnie de St. Gobain, Neuilly-sur-Seine, France
Filed Oct. 3, 1963, Ser. No. 313,590
Claims priority, application France, Oct. 11, 1962, 912,007
Int. Cl. G06k 7/016, 7/08, 19/06
U.S. Cl. 235—61.11 8 Claims

ABSTRACT OF THE DISCLOSURE

Method and means for electronically reading or decoding and transmitting coded bits of information magnetically recorded on magntizable media, wherein the latter has a supplemental magnetized control bit or band spaced from each end of a group of said coded bits and wherein a cooperating magnetic scanning head has a reading unit, including a memory cell or relay, corresponding to each said bit, the spacing of the bits and their respective reading units in the direction of translation of said media relative to the scanning head being such that the coded bits move into registry with their corresponding reading units after the trailing control bit has passed its reading unit to restore the memory cells to a condition for accurate receipt of the recorded information and before the leading control bit moves into registry with its reading unit to trigger the release of the memorized information to a recording device or other utilization mechanism.

Figure 1:
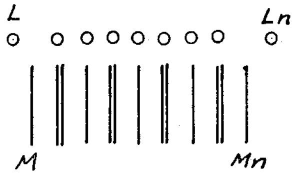

This invention relates to an improvement in the electronic sorting of documents or other articles.

It is known, in the sorting of documents or articles, to apply to them, coded indications corresponding to the destination, purpose, or identity of each. These indications are in the form of magnetizable material applied to the surface of the article and which is uniquely magnetized with discrete bands or spots by passage beneath an inscription or magnetizing head. The indications thus provided on the articles are subsequently detected or read by passing the articles beneath a reading head so that the information thus recovered may be utilized in their identification and sorting.

The prior art procedure just described, while theoretically satisfactory, presents difficulties when carried into practice because errors due to improper positioning or, even more important, excessive speed of the articles as they pass beneath the reading head, are drawbacks not previously obviated.

The present invention has for its object an improvement in the registration of the magnetic information upon the several articles or documents, by which the foregoing drawbacks are obviated.

The invention consists essentially in applying to the article, in addition to the magnetic bands representing and supplying the coded information proper, magnetically registered control means in the form of two supplemental magnetic bands, one ahead of and one trailing the magnetic bands forming the coded information itself, and which are separated by a distance less than the corresponding separation between the corresponding reading units of a scanning head. In the following specification the entire group of bands of any one article will be termed a "block." The two aforesaid supplemental bands will be termed "positioning bands," while those apart from the positioning bands will be termed "coded bands."

As the result of the addition of these two positioning bands forming the subject of the present invention, at the moment when all coded bands corresponding to the actual information on the document, have arrived at and beneath their corresponding reading or scanning head units, one of the two positioning bands has already passed beneath the reading head unit corresponding to it while the other has not yet arrived at position beneath its corresponding reading head unit. In a manner which will appear more clearly from the detailed description following, the positioning bands are utilized to assure proper operation of the reading head in decoding the desired information when the block passes beneath the head. The positioning bands also act to clear the reading head circuits and to thus prepare or trigger them for the next article to be decoded, on completion of the decoding of the article immediately passing the head. Thus correct reading of each inscription is assured and errors otherwise introduced by excessive speed in passage of the documents or articles, as well as by improper or faulty positioning of the articles at the instant of passing the head, are prevented. In other words, reading or decoding of any inscription is effected due to presence of these positioning bands, although the block is presented to or passes beneath the head at an angle which is not precisely 90° with respect to the longitudinal dimension of the bands.

Coded information is registered upon the articles, documents, or objects, by the use of ribbons or sheets of material attached preferably by adhesive and completely covered with a magnetizable material. The magnetizable surface thus provided is passed beneath an inscription head consisting of a plurality of electromagnetic units which are selectively energized at the proper instant, to create discrete magnetized spots or bands in the material. In such a system, for example, a single magnetized band may represent the binary number "1" while the absence of magnetization in an area or band of the material beneath a said unit, will represent binary zero.

Thus if a series of bands, that is, a block of magnetized and unmagnetized bands thus created is subsequently passed beneath a reading or scanning head having discrete reading units spaced the same as the electromagnetic units of the inscription head in which the bands were magnetized, each of the coded bands will simultaneously arrive beneath its respective reading unit and create or fail to create a signal therein which will be representative of binary "1" or zero in accordance with the magntization or non-magnetization of said band, to thus identify the document or article in accordance with the original magnetic inscription. The present invention eliminates errors due to improper positioning of the document as aforesaid, and assures that each one scanned is properly and accurately identified.

Figure 2:
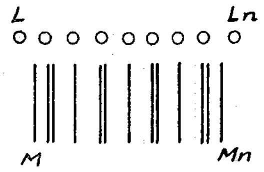

As exemplified in FIG. 2, the result is effected according to one embodiment of the invention, by creating two magnetized positioning bands, one in advance of and one trailing the bands of coded information, and separated therefrom by a distance which is less than the equal spacing between sequential bands of coded information. In such embodiment the total number of reading head units is equal to the number of coded bands plus two, and all of the reading head units are equally spaced the same distance as the coded bands. The invention can be embodied in other ways. Thus, for example, at the inscription head there may be two additional magnetizing units spaced from the units which create the coded bands. Each said additional unit will be at a respective end of the row of units which create the bands of coded information, and all units will, for example, be equally spaced, including the two aforesaid additional magnetizing units to provide a block of equally spaced bands as in FIGS. 1 and 4. At the reading or scanning head for such block of equally spaced bands the two additional scanning units corresponding to the positioning bands are positioned, one in advance of the row of units for reading the coded bands while the other is spaced following such row. The spacing of these two additional position-detecting reading head units from the contiguous reading units will, in the form of the invention shown in FIGS. 1 and 4, be greater than the uniform spacing between sequential units of those which actually detect, read, or scan the coded bands.

FIGURE 1 shows an arrangement as just described, wherein $M$–$M_n$ shows a plurality of magnetized bands of uniform spacing. As previously described, the right and left terminal positioning bands are those created by the aforesaid additional magnetizing units of the inscription head. In this set-up, it will be noted that all bands are uniformly spaced but that, in the reading or scanning head indicated at $L$–$L_n$ the leading and trailing units thereof are spaced from the next adjacent units by a distance greater than the uniform spacing of the units which actually scan or detect the bands of coded information.

FIGURE 2 shows a second arrangement wherein at the inscription head, the two additional magnetizing units are spaced from the information-coding units by a distance less than the uniform spacing of the principal coding units to create a block or pattern of magnetized bands $M$–$M_n$. With such a pattern, all units $L$–$L_n$ of the scanning head may be uniformly spaced as shown.

Figure 3:
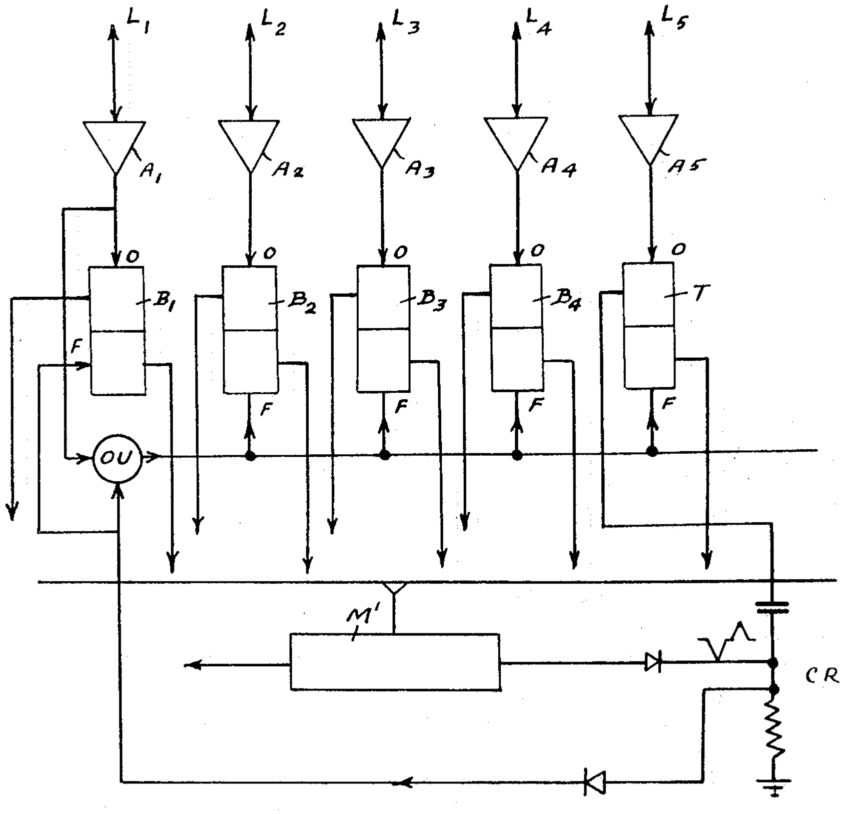

The memory device controlled by the scanning head comprising units $L$–$L_n$ is shown schematically upon FIGURE 3, wherein, for illustration there has been selected the simple case of three magnetic bands of coded information in addition to two positioning bands, making a total of five units identified respectively as $L_1$, $L_2$, $L_3$, $L_4$, and $L_5$. In this set-up $L_1$ and $L_5$ are the scanning units for the aforesaid positioning bands the operation of which is depicted upon FIGURE 4.

Figure 4:
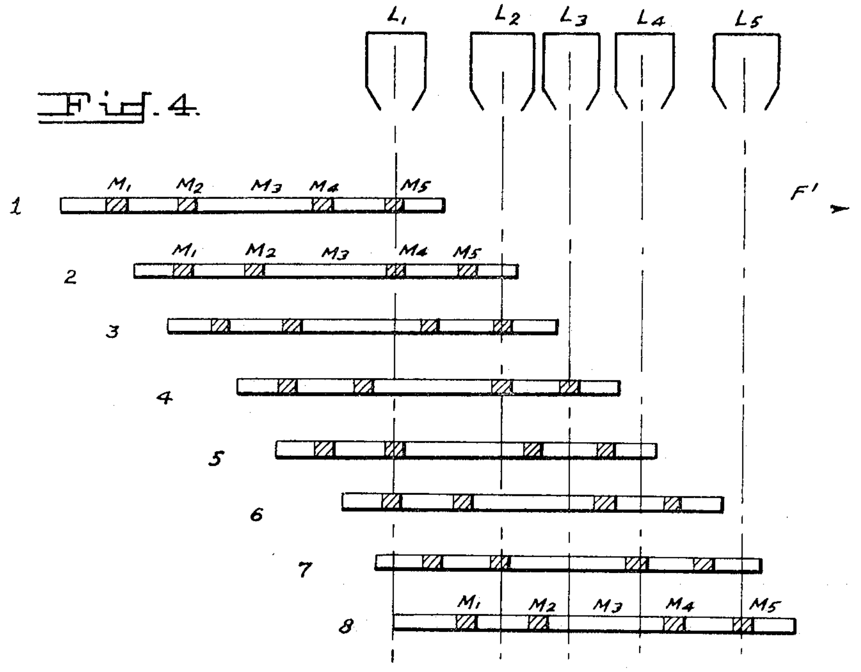

Referring to FIGURE 4 it will be noted that $L_2$, $L_3$, and $L_4$ are uniformly spaced while $L_1$ is spaced a greater distance ahead of $L_2$, and $L_5$ is spaced the same greater distance behind $L_4$.

Reverting to FIGURE 3, each scanning unit $L_1$, $L_2$, etc. is electrically connected with a corresponding one of a plurality of amplifiers $A_1$, $A_2$, $A_3$, $A_4$, and $A_5$. Each amplifier has its output connected with a respective one of a plurality of two-position relays or flip-flops $B_1$, $B_2$, $B_3$, and $B_4$. The amplifier $A_1$ is also directly connected in a logical "OR" circuit which, in addition, includes the circuits F closing each of the relays $B_2$, $B_3$, and $B_4$, and also a triggering relay T associated with scanning unit $L_5$ through the output of amplifier $A_5$. As shown, this triggering relay T is hooked up with a differentiating circuit CR which transmits negative impulses to the recorder M′, and positive impulses to the aforesaid logical "OR" circuit. As schematically represented upon FIGURE 3, all of the other relays $B_1$, $B_2$, etc., are also connected to the same recorder, as indicated by the conductor lines extending downwardly from the right lower portion of each relay and terminating in a downwardly-directed arrow head.

FIGURE 4 shows the several significant steps in operation of the scanning head as a coded document or article passes beneath it moving from left to right. The article is assumed to have been previously passed beneath an inscription head and there inscribed with a block of equally spaced bands including two positioning bands $M_1$ and $M_5$. The magnetized bands are indicated by the hatched rectangles. In the example chosen there are three coded bands $M_2$, $M_3$, and $M_4$, of which $M_2$ and $M_4$ have been magnetized, while $M_3$ has been left unmagnetized as indicated by the blank area thereof. The coded binary number is therefore 101. In the figure the several steps, eight in number, are identified at the left thereof. Each number represents a successive significant step which is explained in the following correspondingly-numbered paragraphs.

(1) When the article or ticket is translated in the direction of the arrow F′, FIGURE 4, in passing beneath the scanning head, and arrives at position 1, the magnetized positioning band $M_5$ is beneath scanner unit $L_1$. The resulting variation in flux created in unit $L_1$ by the magnetism of band $M_5$ is converted thereby into a signal which, after amplification at $A_1$ is impressed on relay $B_1$ to move the armature-controlled contacts thereof to open or "0" position or state. At the same time this impulse, due to the connection of amplifier $A_1$ with the logical "OR" circuit, energizes relays $B_2$, $B_3$, and $B_4$ and T to convert them from open to closed or F positions if they are not already in a closed state.

(2) In position 2 the magnetic band $M_4$ is located beneath unit $L_1$ while band $M_5$ due to the variation in spacing of the unit $L_1$ from $L_2$ as compared with that between $L_2$, $L_3$, and $L_4$, has not yet arrived beneath unit $L_2$. Since relay $B_1$ is in the open condition or state, the passage of magnetized band $M_4$ beneath $L_1$ is without effect.

(3) In this position magnetized band $M_5$ is beneath unit $L_2$ and the resulting impulse or signal thereby created energizes relay $B_2$ to the open or "0" position.

(4) Band $M_3$ has just passed from beneath unit $L_1$, but being unmagnetized did not create a signal therein. In the position shown, bands $M_4$ and $M_5$ are simultaneously beneath units $L_2$ and $L_3$. Corresponding signals are thus created in amplifiers $A_2$ and $A_3$ to open relay $B_3$. Since relay $B_2$ was previously opened in step 3, supra, the passage of band $M_4$ beneath unit $L_2$ has no effect upon relay $B_2$.

(5) Band $M_2$ arrives beneath head $L_1$ and effects a signal which has the same result as the passage therebeneath of band $M_5$, that is to say, relay $B_1$ remains open while relays $B_2$ and $B_3$ are returned to the closed condition or state and relays $B_4$ and T remain in the closed state.

(6) Band $M_1$ passes beneath unit $L_1$ but creates no effect on relay $B_1$ since this relay is already in the open condition. Otherwise, this passage of band $M_1$ has the same effect as the passage of $M_5$ beneath unit $L_1$; that is, the conversion of all other relays to closed or F state by an impulse through the "OR" circuit, thereby preparing the memory relay units for properly reading and memorizing the coded information of bands $M_2$, $M_3$ and $M_4$.

(7) Bands $M_2$, $M_3$, and $M_4$, of coded information, pass simultaneously beneath units $L_2$, $L_3$, and $L_4$, respectively, and each imparts its information to the respective unit. In the example selected, since band $M_3$ is not magnetized, there is no effect upon unit $L_3$ so that relay $B_3$ remains closed. At the same time however, bands $M_2$ and $M_3$ create signals in the respective units $L_2$ and $L_4$ which act to open relays $B_2$ and $B_4$. This phase is the one therefore in which the invention is utilized because the exact information desired is imparted or impressed upon units $L_2$, $L_3$ and $L_4$ and memorized by the resulting state of relays $B_2$, $B_3$ and $B_4$.

(8) Band $M_5$ passes beneath head $L_5$ and creates a signal therein whose duration will depend upon the speed of travel of the article being decoded. The negative impulse created by initiation of this signal is conveyed by trigger relay T over the differentiating circuit CR and passes to recorder M′ which thus effects recordation or indications of the desired information, in this case, the binary number 101. The positive impulse established by band $M_5$ in unit $L_5$ is also passed by the differentiating circuit to relay $B_1$ which is thereby returned to closed or F condition. Likewise all other relays which were open at the moment of step 7, supra, are restored to closed or F position by the same signal, it being understood that suitable time delay control affords time for recorder or indicator M′ to perform its intended function, before the apparatus is cleared for the next succeeding cycle or read-out.

It is clear that the procedure described is not dependent upon precise positioning of the bands beneath the scanning head and is independent of the speed of passage therebeneath. Thus the beneficial result is attained even though the block of bands passes beneath the scanner at an angle which is appreciably different than 90°, because the angle of approach or passage beneath the scanner or reading head is not highly critical. Hence a change of such angle of approach within reasonable limits, does not alter the sequence which alone governs the functioning of the device.

Figure 5:
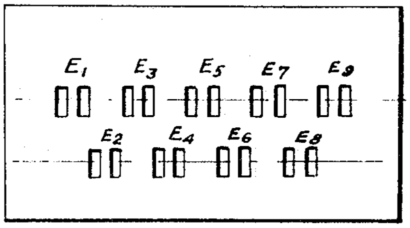
Figure 6:
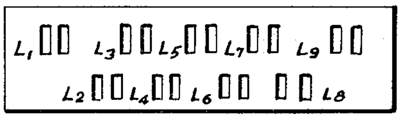

In practice it may be advantageous to arrange the inscription head units and also those of the scanning head, in two or more parallel lines or rows. As shown upon FIGURE 5, an inscription head may have nine equally spaced electromagnetic units of which $E_2$ through $E_8$ apply equally spaced coded information bands to an article while $E_1$ and $E_9$ apply positioning bands having the function as previously described for bands $M_1$ and $M_5$ in connection with FIGURE 4. FIGURE 6 represents an arrangement of nine scanning units identified as $L_1$ through $L_9$. It will be observed that, in conformity with the versatility of the invention, the distance by which positioning units $L_1$ and $L_9$ are spaced from the next adjacent units $L_2$ and $L_8$, respectively, is different from the spacing between units $L_2$ through $L_8$ which are for reading coded information.

In practice, a distance of about 5 mm. between magnetizable bands is satisfactory, which corresponds to an air gap of about 1 mm. for the electromagnets. The two terminal units $L_1$ and $L_9$ may be spaced 8 mm. from the respective units $L_2$ and $L_8$. In the case of seven units of coded information, as shown, this will enable the inscription of 128 different binary numbers. With such a spacing it is possible that the article may pass beneath the scanner at angles of 20° without error in reading.

The speed of passage should not be too great because the amplitude of the signal or impulse is a function of this speed. For a spacing of 1 mm. as aforesaid, a linear speed of 10 cm. per second or greater is permissible. In any event the maximum possible speed is greater than any requirement encountered in actual practice.

Although only two embodiments of the invention have been illustrated and described in detail, the same can, as pointed out above, be materialized in several ways as respects the spacing of the reading head and inscription head units and hence, of the magnetizable bands applied and read by said heads. It is sufficient, as also pointed out above, that these spacings be such that when all of the coded bands on the article have moved into registry with their respective reading head units, as illustrated in position 7 of FIG. 4, the trailing one of the two positioning bands will have passed its corresponding reading head unit $L_1$ while the leading positioning band will not yet have moved into registry with its corresponding reading head unit $L_5$.

Having thus disclosed the invention, what is claimed is:

1. The combination with a device for identifying and sorting articles, each provided with a plurality of spaced magnetizable bands aligned linearly to form a block, of a scanning head comprising a like plurality of spaced reading units similarly aligned, said bands and their corresponding reading units being respectively aligned in the direction of the movement of the articles past the scanning head, the spacing between the first and second bands and the spacing between the penultimate and ultimate bands of said block being different, respectively, from the spacing of the first and second reading units and the spacing of the penultimate and ultimate reading units of said scanning head, all other bands of said block being spaced the same as the corresponding reading units of said scanning head.

2. The combination of claim 1, all bands of said block being uniformly spaced.

3. The combination of claim 1, all said reading units being equally spaced.

4. The combination of claim 1, the spacing of said first and ultimate bands being less than the spacing of said first and ultimate reading units.

5. The combination of claim 4, the remainder of the bands of said block and the remainder of the reading units of the scanning head being uniformly spaced.

6. The combination of an article bearing discrete magnetizable coded bands for representing coded information, said coded bands being uniformly spaced, each said coded band being, respectively, magnetized or left unmagnetized in predetermined sequence by passage in inductive relation with a magnetizing inscription head to conjointly represent a binary number according to a binary system of digits having a total number of digits equal to the total number of said coded bands and occurring in the same order as the sequence of magnetized and unmagnetized bands, said binary number uniquely identifying the article, and two magnetized positioning bands, each said positioning band being spaced, respectively, ahead of the leading one of said coded bands and behind the trailing one of said ccded bands, and a magnetic scanning head comprising a reading unit corresponding to each of said coded and positioning bands, said bands and their corresponding reading units being respectively aligned in the direction of the movement of the article past the scanning head, the spacing of said positioning bands in said direction being less than such spacing of corresponding reading units of said scanning head adapted for reading said positioning bands.

7. The combination of an article bearing a plurality of linearly spaced, aligned bands of magnetizable material, the second through the penultimate ones of said bands forming a group, the bands of said group being respectively magnetized, or left unmagnetized, in the same sequence as the digits 1 and 0 of a predetermined binary number uniquely identifying said article and having a total of digits equal to the total of bands in said group, each band of said group representing a respective one of the digits of said number, and a magnetic scanning head comprising a reading unit corresponding to each of said bands, the first and ultimate ones of said bands being positioning bands and spaced from each other in the direction of movement of the article past the scanning head by a distance less than such spacing of corresponding reading units on said scanning head adapted for reading said positioning bands.

8. In an electronic scanner, a plurality of linearly aligned discrete scanning units, a plurality of amplifiers each having its input connected with and responsive to a respective one of said units, a plurality of relays each connected with the output of a respective one of said amplifiers, a first circuit connecting the output of the amplifier of the leading one of said units to each said relay excluding the one corresponding to said leading one of said units, a differentiating circuit connected with each said relay to be controlled thereby, and a time-delay control connection between the relay corresponding to the final one of said units and said first circuit.

References Cited

UNITED STATES PATENTS

| | | | |
|---|---|---|---|
| 2,625,786 | 1/1953 | Potter. | |
| 3,289,190 | 11/1966 | Guerth. | |
| 3,096,511 | 7/1963 | Taras | 340—174.1 |

OTHER REFERENCES

Pingry, C. O.: Readout From Magnetic Media, I.B.M. Technical Disclosure Bulletin, vol. 4, No. 4, September 1961.

MAYNARD R. WILBUR, Primary Examiner

THOMAS J. SLOYAN, Assistant Examiner

U.S. Cl. X.R.

235—61.12